(12) United States Patent
Kim (10) Patent No.: US 7,590,850 B2
(45) Date of Patent: Sep. 15, 2009

(54) DIGITAL SIGNATURE METHOD BASED ON IDENTIFICATION INFORMATION OF GROUP MEMBERS, AND METHOD OF ACQUIRING IDENTIFICATION INFORMATION OF SIGNED-GROUP MEMBER, AND DIGITAL SIGNATURE SYSTEM FOR PERFORMING DIGITAL SIGNATURE BASED ON IDENTIFICATION INFORMATION OF GROUP MEMBERS

(75) Inventor: Dae-youb Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 805 days.

(21) Appl. No.: 10/976,909

(22) Filed: Nov. 1, 2004

(65) Prior Publication Data

US 2005/0097316 A1 May 5, 2005

(30) Foreign Application Priority Data

Nov. 1, 2003 (KR) .................. 10-2003-0077186

(51) Int. Cl.
H04L 9/32 (2006.01)
(52) U.S. Cl. ........................ 713/176; 382/186
(58) Field of Classification Search ............... 713/156, 713/170, 176, 177, 178; 380/30; 382/121, 382/186
See application file for complete search history.

(56) References Cited

U.S. PATENT DOCUMENTS

| 6,243,467 | B1 * | 6/2001 | Reiter et al. ............. 380/30 |
| 6,298,153 | B1 * | 10/2001 | Oishi ..................... 382/186 |
| 6,307,955 | B1 * | 10/2001 | Zank et al. ............. 382/121 |
| 6,820,199 | B2 * | 11/2004 | Wheeler et al. .......... 713/170 |
| 7,058,804 | B1 * | 6/2006 | Akashika et al. ......... 713/156 |
| 7,167,986 | B2 * | 1/2007 | Hughes et al. ........... 713/178 |
| 2002/0049906 | A1 * | 4/2002 | Maruyama et al. ....... 713/176 |
| 2002/0116619 | A1 * | 8/2002 | Maruyama et al. ....... 713/176 |
| 2002/0157006 | A1 * | 10/2002 | Narishima et al. ....... 713/177 |
| 2002/0184504 | A1 * | 12/2002 | Hughes .................. 713/177 |
| 2003/0056100 | A1 * | 3/2003 | Beatson ................. 713/176 |
| 2004/0168064 | A1 * | 8/2004 | Shimizu et al. ......... 713/176 |
| 2004/0243807 | A1 * | 12/2004 | Hughes et al. .......... 713/176 |

OTHER PUBLICATIONS

Elgamal, T ; A public key cryptosystem and a signature scheme based on discrete logarithms; Jul. 1985; vol. 31, Issue: 4; pp. 469-472.*
Xia, Shundong, et al., "A group signature scheme with strong separability", The Journal of Systems and Software, 60:177-182 (2002).

* cited by examiner

Primary Examiner—Kambiz Zand
Assistant Examiner—Monjour Rahim
(74) Attorney, Agent, or Firm—McNeely Bodendorf LLP (57) ABSTRACT

A digital signature method based on identification information of one or more group members who belong to a group includes: a) a group parameter generating operation generating group public key information and group secret key information corresponding to the group; b) a member registering operation generating member secret key information using identification information of the group members who belong to the group and an identification information digest value obtained by applying a predetermined hash function to the identification information, and transmitting the member secret key information to the group members; c) a digital signing operation generating a digital signature by applying a predetermined signature algorithm to the identification information and the identification information digest value, and transmitting the generated digital signature and a message; and d) an authentication operation verifying a validity of the digital signature by applying a predetermined authentication algorithm to the message and the digital signature.

16 Claims, 8 Drawing Sheets

- START
- SELECT RANDOM NUMBERS $\beta, \omega, \varepsilon, \tau, \pi \in Zm$ — S605
- CALCULATE $t = y^\beta \times g^\pi \bmod m$ — S615
- CALCULATE $A = (\varepsilon \times \tau \times z_i) \bmod m$ — S625
- CALCULATE $B = \varepsilon^{\theta \cdot u} \cdot h^\omega \bmod m$ — S635
- CALCULATE $C = \varepsilon^\theta \cdot y^\omega \cdot ID_i$ — S645
- CALCULATE $D = \tau \cdot g^\omega \cdot H(ID_i)$ — S655
- CALCULATE $E = H(y \| g \| h \| A \| B \| C \| D \| t \| M)$ — S665
- CALCULATE $F = \beta - E \times \omega$ — S675
- CALCULATE $G = \pi - (E \times \theta \times (\omega + x_i))$ — S685
- TRANSMIT $(A, B, C, D, E, F, G)$ — S695
- END

DIGITAL SIGNATURE METHOD BASED ON IDENTIFICATION INFORMATION OF GROUP MEMBERS, AND METHOD OF ACQUIRING IDENTIFICATION INFORMATION OF SIGNED-GROUP MEMBER, AND DIGITAL SIGNATURE SYSTEM FOR PERFORMING DIGITAL SIGNATURE BASED ON IDENTIFICATION INFORMATION OF GROUP MEMBERS

BACKGROUND OF THE INVENTION

1. Field of the Invention

The present invention relates to data encryption. More particularly, the present invention relates to a digital signature method and system based on identification information of group members.

2. Description of the Related Art

With the increased use and development of computers, reliance on networks for exchanging information between computers has also increased. As computer networks become more prevalent, abuses thereof, and thus, the importance of network security techniques, have increased.

Protocols for sharing keys between entities are techniques for preserving the confidentiality of data transmitted through networks.

Figure 1A:
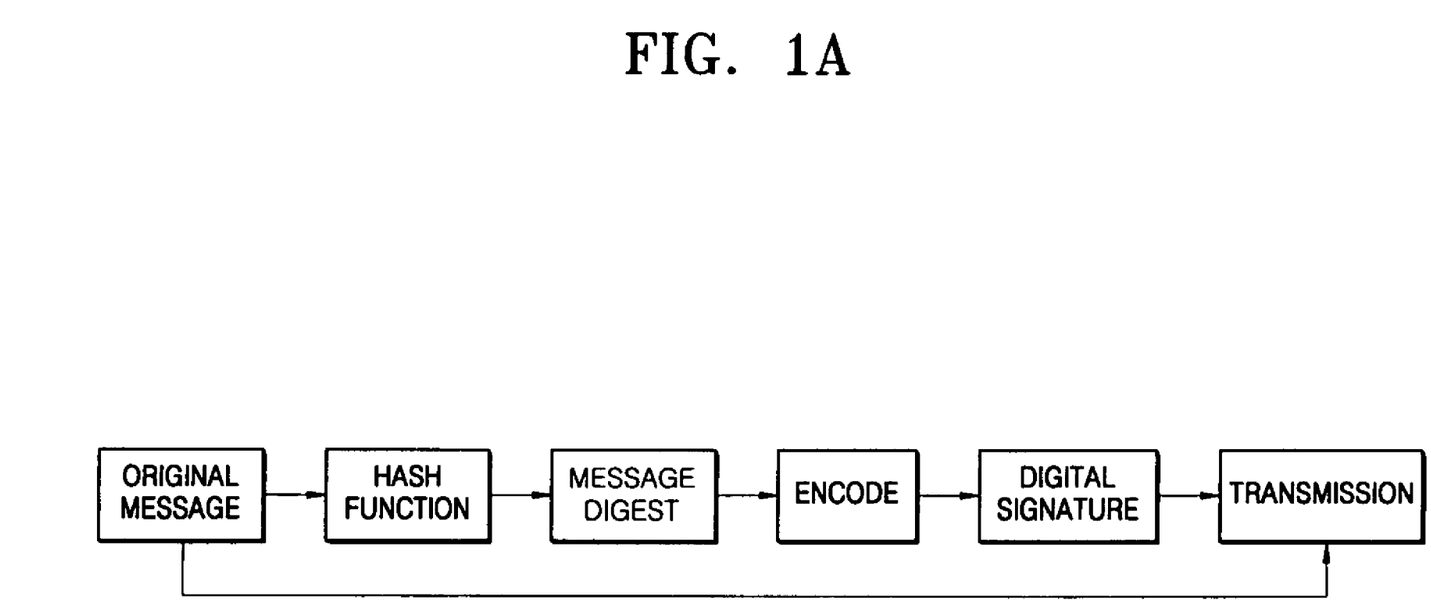
FIG. 1A is a block diagram of a exemplary digital signature.
Figure 1B:
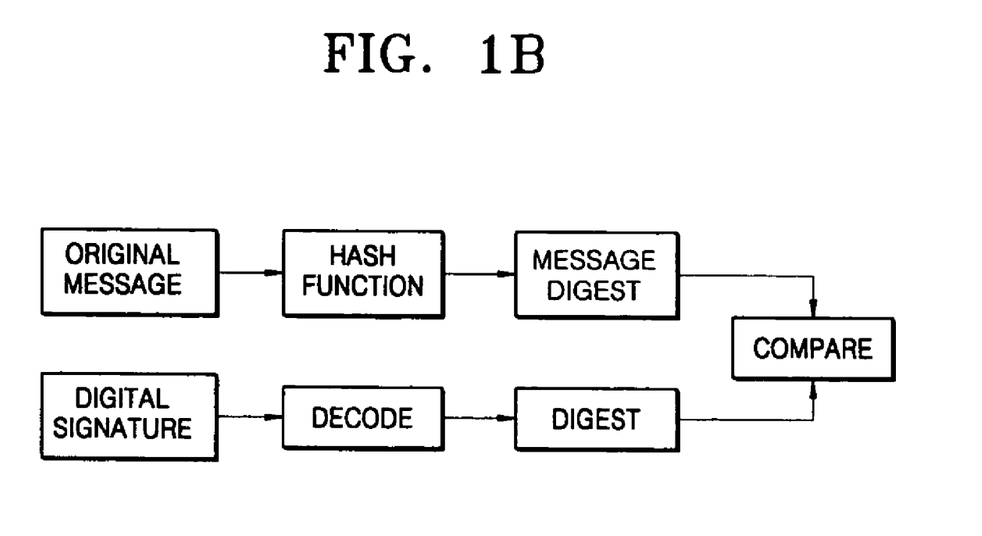
FIG. 1B is a block diagram of a exemplary digital signature authentication process.

FIG. 1A is a block diagram of a exemplary digital signature process. FIG. 1B is a block diagram depicting a exemplary digital signature authentication process. The block diagrams of FIGS. 1A and 1B may be used with conventional digital signature processes.

A conventional digital signature process employs a public key encryption technique using a hash function. In a public key encryption algorithm, which is an asymmetric encryption system with different encryption keys and decryption keys, a sender performs encryption, i.e., encoding, using his/her own secret key and a receiver's public key, as shown in FIG. 1A. Then, the receiver performs decryption, using his/her own secret key and a sender's public key, as shown in FIG. 1B. This asymmetric encryption system is mainly used for distributing encryption keys or session keys and for digital signatures, as shown, rather than for message encryption. As shown in FIG. 1A, the digital signature is then transmitted with the original message.

The hash function, which converts a message into a digest value of fixed length, is a unidirectional function, so it is impossible to obtain the original message from the digest value. Since the probability that a message different from the original message has the same message digest is very low, the hash function is used for confirming whether the message is forged. Frequently used hash functions include Message Digest 5 (MD5) and Secure Hash Algorithm (SHA).

As shown in FIG. 1B, a receiver receives the original message and the digital signature sent in FIG. 1A. Then, the receiver performs user authentications, message integrity checks, and non-repudiation checks by comparing the digest value which results from inputting the original message to the hash function with the digest value which results from decrypting, i.e., decoding, the digital signature.

Key sharing protocols among entities require a public key authentication system confirming whose public key is used for the digital signature. Such a system is called a Public Key Infrastructure (PKI). A public key certificate is issued from a third institution that every user can trust. That is, in the PKI, a certified institution is required for distributing and authenticating the public key certificate in order to guarantee the integrity of the public key. Therefore, an encryption technique using identification information of group members as public keys has been developed to manage public keys without appealing to the certified institution.

The identification information can include private information such as user's social security number, address, age, and the like, and logical addresses such as an IP address or a MAC address of the terminal to which the user is hooked up.

A group signature method to perform a digital signature on behalf of a group has been introduced in advanced home networking. For example, suppose that one electronic device out of many devices in a home performs a digital signature. In this case, only the digital signature has to be identified, since the specific electronic device which performed the digital signature is not of interest. A group signature technique that only identifies the group who performed the digital signature was first introduced by Chaum and Heijst.

Furthermore, a group signature technique based on user identification information, and using the above-mentioned user identification information-based encryption method and the group signature method has been developed. Such a group signature technique generates the keys used in digital signatures of group members using identification information of group members, and does not require a separate operation for processing certificates when authenticating digital signatures. In addition, this technique can quickly acquire the identification information of the signed-members.

However, the group signature method according to the conventional art has certain drawbacks. For example, new group members are not allowed after initialization. Furthermore, the group signature method does not work properly after adding or deleting group members. Also, the length of digital signature increases as the number of members increases. As an additional disadvantage, the functions of the group manager cannot be separated in the conventional group signature method.

Therefore, an advanced encryption method which has a fixed-length digital signature irrespective of the addition/deletion of group members and is safe from attacks such as forgery, conspiracy, etc., is highly desirable. Furthermore, an advanced encryption method that provides separability of the functions of the group manager is greatly needed.

SUMMARY OF THE INVENTION

The present invention is therefore directed to a digital signature method and system based on identification information of group members, which substantially overcome one or more of the problems due to the limitations and disadvantages of the related art.

It is a feature of an embodiment of the present invention to provide a digital signature method and system based on identification information of group members, which performs authentication of digital signatures irrespective of the addition/deletion of group members.

It is another feature of an embodiment of the present invention to provide a digital signature method and system, which acquires identification information of a group member who performed a digital signature.

It is still another feature of an embodiment of the present invention to provide a digital signature method and system based on identification information of group members, which is safe from outside attacks.

At least one of the above and other features and advantages may be realized by providing a digital signature method based on identification information of one or more group members who belong to a group, the method including: a) a group parameter generating operation generating group public key information and group secret key information corresponding to the group; b) a member registering operation generating member secret key information using identification information of the group members who belong to the group and identification information digest value obtained by applying a predetermined hash function to the identification information, and transmitting the member secret key information to the group members; c) a digital signing operation generating a digital signature by applying a predetermined signature algorithm to the identification information and the identification information digest value, and transmitting the generated digital signature and a message; and d) an authentication operation verifying a validity of the digital signature by applying a predetermined authentication algorithm to the received message and the digital signature.

The predetermined signature algorithm may use different random numbers every time a digital signature is generated.

At least one of the above and other features and advantages may be realized by providing a method for acquiring identification information of a signed-group member in data encryption using public key encryption based on identification information of one or more group members who belong to a group, the method including: a) a group parameter generating operation generating group public key information and group secret key information corresponding to the group; b) a member registering operation generating member secret key information using identification information of the group members who belong to the group and an identification information digest value which results from application of a predetermined hash function to the identification information, and transmitting the member secret key information to group members; c) a digital signing operation for performing digital signature by applying a predetermined signature algorithm to the identification information and the identification information digest value, and transmitting the generated digital signature and a message; and d) an identification information acquiring operation acquiring the identification information of group members who have performed the digital signature using the group secret key information.

Furthermore, at least one of the above and other features and advantages may be realized by providing a computer-readable medium having recorded thereon a computer program for performing the digital signature method based on identification information of group members.

At least one of the above and other features and advantages may be realized by providing a digital signature system performing digital signature based on identification information of one or more group members who belong to a group, the system including: a group parameter generator generating group public key information and group secret key information corresponding to the group; a member secret key information generator generating member secret key information using identification information of the group members who belong to the group and an identification information digest value obtained by applying a predetermined hash function to the identification information, and transmitting the member secret key information to the group members; a digital signing unit performing digital signature by applying a predetermined signature algorithm to the identification information and the identification information digest value, and transmitting the generated digital signature and a message; and a digital signature authenticator verifying a validity of the digital signature by applying a predetermined authentication algorithm to the message and the digital signature. The digital signing unit may use different random numbers every time a digital signature is generated.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Korean Patent Application No. 2003-77186, filed on Nov. 1, 2003, in the Korean Intellectual Property Office, and entitled: "Digital Signature Method Based on Identification Information of Group Members, and Method of Acquiring Identification Information of Signed-Group Members, and Digital Signature System for Performing Digital Signature Based on Identification Information of Group Members," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. As used herein, "algorithm" is to mean a step-by-step problem solving procedure.

The digital signature method according to an embodiment of the present invention includes the following operations.

Group parameter defining operation: generates group public key information and group secret key information.

Group member registering operation: adds new group members are added in this operation using a predetermined protocol.

Digital signature operation: generates a digital signature.

Authentication operation: authenticates the validity of the digital signature.

Group member information acquiring operation: acquires the identification information of the group member who performed the digital signature using a message and the group public key information.

Figure 2:
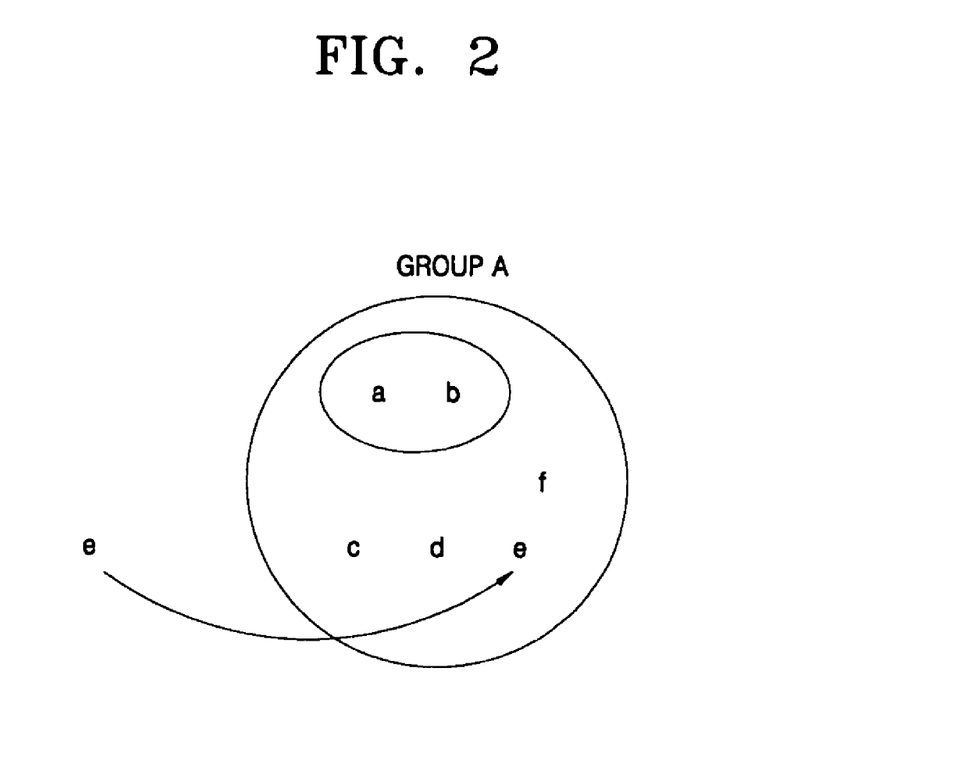
FIG. 2 illustrates characteristics of a digital signature method according to an embodiment of the present invention.

FIG. 2 shows the characteristics of a digital signature method according to an embodiment of the present invention. Group A shown in FIG. 2 includes members a, b, c, d, e, and f. Each of the members a, b, c, d, e, and f can perform a digital signature on behalf of the group. When the digital signature is performed by one of the members a, b, c, d, e, and f, the group signature of group A is identified outside the group A.

For example, suppose that the group A is a company which has group members a, b, c, d, e, and f, and a seller is going to supply goods to this company. In this case, the authorizer of the digital signature is the seller who desires to sell the goods.

At first, the seller sends a subscription to the group A for the contract for the goods. Then, the members a, b, c, d, e, and f of the group A discuss the subscription from the seller. When they decided to accept the subscription, one of the members a, b, c, d, e, and f performs the digital signature as a representative of the group A. The seller then verifies the digital signature and supplies the goods to group A when it is determined that the signature is valid. In this case, the member who specifically performed the digital signature is not of interest to the seller. Rather, the seller only identifies any signature by the members as the signature of the group A.

Types of attempts to attack such a digital signature method are as follows:

Forgery: A safeguard against an attack by e outside the group A pretends to be a member of the group A (when, e.g., e is outside the group A in FIG. 2) by forging the digital signature is needed.

Conspiracy: A safeguard against an attack by two or more valid group members (such as a and b in FIG. 2) who generate a virtual group member (such as f in FIG. 2) and perform the digital signature is needed.

Anonymity: A safeguard against revealing the identification information of a signed-member is needed. For example, when two digital signatures by the members of the group A are received, no one should be able to identify whether these digital signatures are performed by only one member, since the identification information of the signed-member can be exposed when one can tell that the signatures are performed by one member.

Thus, it is desirable that the group digital signature method is robust to forgery and conspiracy attacks, and that the group digital signature method does not expose the identification information of the signed-member.

Figure 3:
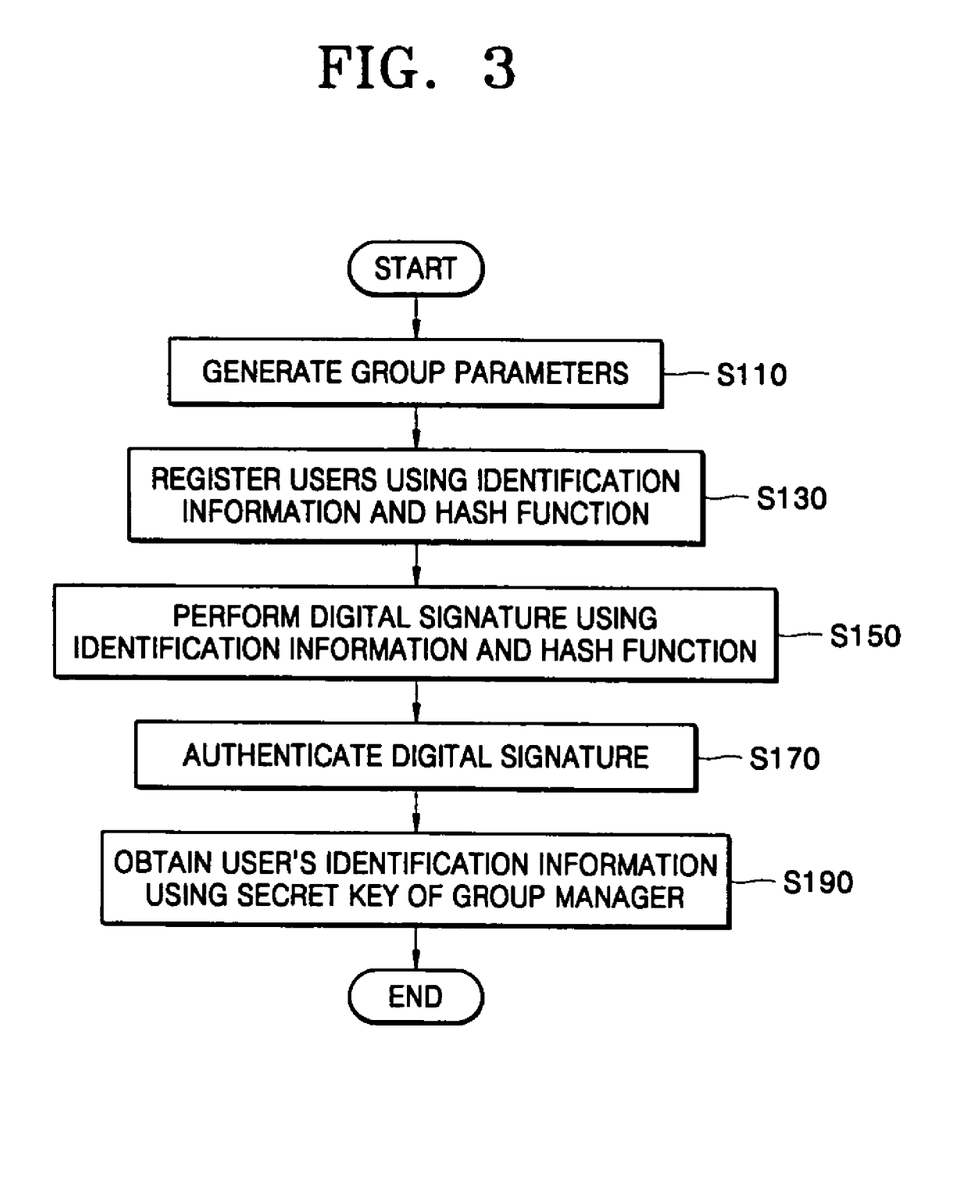
FIG. 3 is an overview flow chart of a digital signature method based on identification information of group members according to an embodiment of the present invention.

FIG. 3 is an overview flow chart of the digital signature method based on identification information of group members according to an aspect of the present invention.

First, group parameters of a group including a plurality of group members are generated in operation S110. The group parameters include public key information and secret key information of a group manager. The group manager shares the generated public key information and stores/manages the secret key information safely. The group parameters can be generated by the group manager or by a certified authority. The trustworthiness of the generated group parameters is increased when they are generated by the certified authority. The operation S110 is presented in detail in FIG. 4.

After the group parameters are generated, the group members are registered in operation S130 using the identification information of the group members and a hash function. A conventional group digital signature method based on identification information of group members uses only identification information of group members to perform registration. That is, secret key information of group members is generated using the identification information of group members as public key information of group members, and the generated secret key information of the group members is delivered to corresponding group members. On the other hand, the digital signature method according to an embodiment of the present invention uses identification information digest values obtained by applying the hash function to the identification information of the group member as well as the identification information of the group members to generate the secret key information of the group member. Using the identification information and the identification information digest values of the group members, it is possible to substantially defend against an outside forgery attack and an inside conspiracy attack. This is because the hash function is a unidirectional function, and it is substantially impossible to trace back the identification information from the identification information digest values. The group member registering operation S130 will be described in detail in FIG. 5.

After registration, the group members compute digital signatures using identification information and member specific identification information digest value. In the group digital signature method according to the present invention, the identification information digest value as well as the identification information of the group members is used not only in the group member registering operation but also in the digital signing operation S150. Using identification information digest value additionally, it is possible to defend systems against forgery and conspiracy attacks as noted above. In addition, the group digital signature method according to the present invention uses different random values every time a digital signature is created. Digital signatures of the group members are different from one another, since different random values are used for the digital signing operation. Therefore, anonymity of the signed-member is secured because there is no relativity in the digital signatures performed by the group members. The digital signing operation S150 will be described in detail in FIG. 6.

Then, whether the digital signature is valid is authenticated is determined in operation S170. The validity of the digital signature is determined by applying a predetermined authentication algorithm to received messages and digital signatures using the group manager public key information generated in operation S130. That is, the verification value calculated by the authentication algorithm is compared with a received value to determine whether the digital signature is valid. The digital signature authentication operation S170 will be described in detail in FIG. 7.

The digital signature method based on the identification information of the group members according to the present invention includes an identification information acquiring operation S190 for identifying the signed-member who generated the digital signature when there is a problem with the digital signature. Even in this case, it is required that the signed-member must not be able to be identified from the outside. Therefore, it is preferable that the identification information acquiring operation S190 be performed only by the group manager. In the digital signature method according to the present invention, the group manager acquires the identification information of the signed-member using his/her own secret key information. Therefore, the identification information of the signed-member can be acquired only by the group manager. The identification information acquiring operation S190 will be described in detail in FIG. 8.

Figure 4:
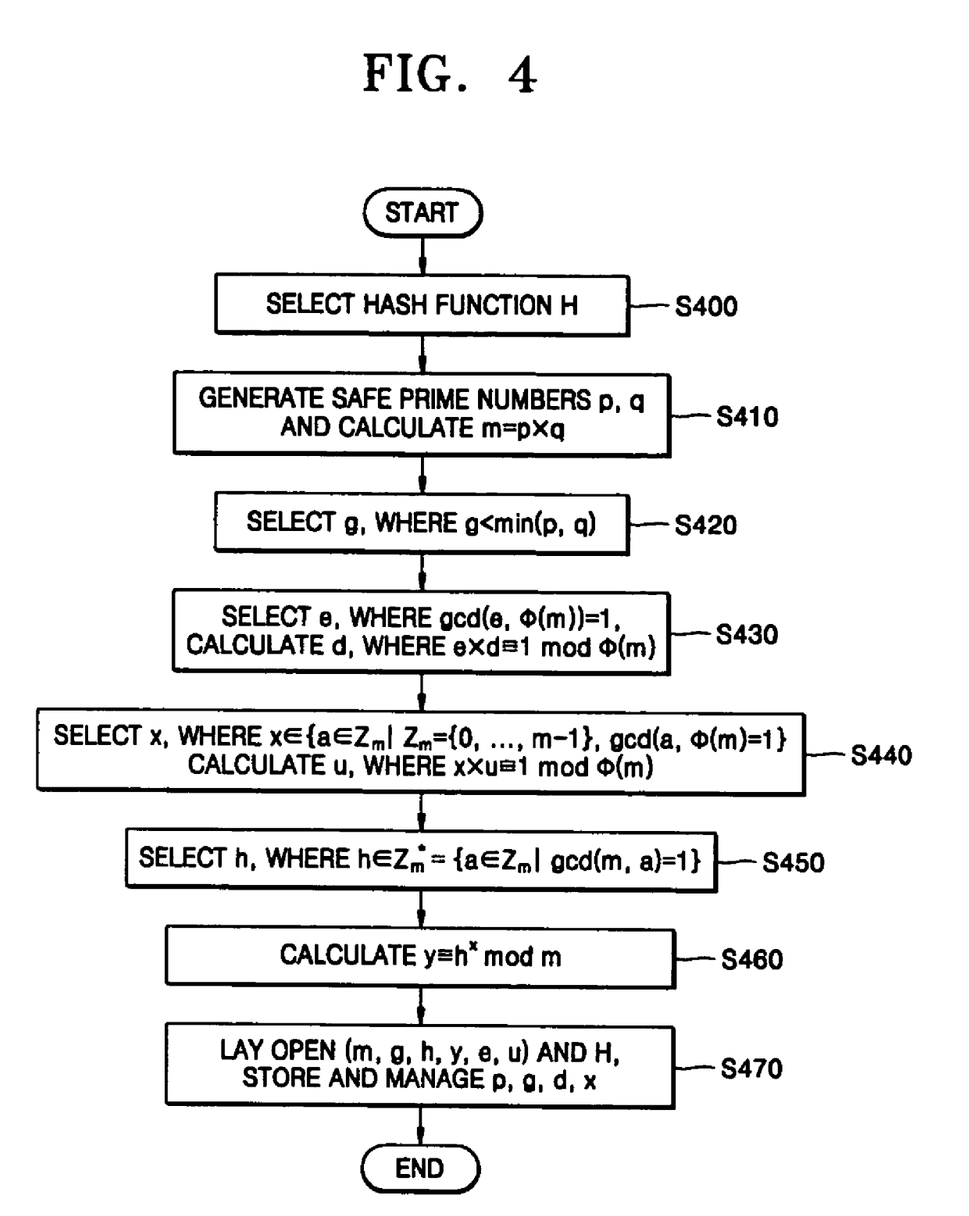
FIG. 4 is a detailed flow chart of the group parameter generating operation in the overview flow chart of FIG. 3 according to an embodiment of the present invention.

FIG. 4 is a detailed flow chart of the group parameter generating operation S110 in the overview flow chart of FIG. 3.

First, a hash function H to be used for encryption is selected in operation S400. The hash function is a unidirectional function as explained above, which converts the original message into a digest value having a fixed length. Any hash function which has non-linearity characteristics can be used for the present invention.

When the hash function H is selected, safe prime numbers p and q are selected as the first and second group manager secret key information, and the selected first and second group manager secret key information are multiplied (p×q) to generate a first group manager public key information m in operation S410. In addition, one set which satisfies $Z_m=\{0, 1, \ldots, m-1\}$ and another set which satisfies $Z_m^*=\{a \in Z_m/\gcd(m, a)=1\}$ are defined in the digital signature method shown in FIG. 4.

Then, a random number g which is smaller than the smaller one of the first and second group manager secret key information (g<min(p, q)) is selected as a second group manager public key information in operation S420.

Then, a fourth group manager public key information e, which satisfies $\gcd(e, \Phi(m))=1$ is selected, and a fourth group manager secret key information d, which satisfies $e \cdot d \equiv 1 \bmod \Phi(m)$, is calculated using the fourth group manager public key information e. Here, $\Phi(m)$ is an Euler's totient function, and is defined so that $\Phi(m)=(p-1)(q-1)$.

In operation S440, a third group manager secret key information x, which is an element of the set $\{a \in Z_m/\gcd(a, \Phi(m))=1\}$, is selected, and a third group manager public key information u which satisfies $x \cdot u \equiv 1 \bmod \Phi(m)$ is calculated.

Then, an arbitrary value h, which is an element of the set $Z_m^*$, is selected in operation S450, and $y \equiv h^x \bmod m$ is calculated in S460 using the selected value h.

In operation S470, the first through fourth group manager public key information (m, g, u, e) are laid open as the group manager public key information, and the first through fourth group manager secret key information (p, q, x, d) are stored/managed as the group manager secret key information. The arbitrary value h, selected in operation S450, and y, calculated in operation S460, can also be laid open as the group manager public key information.

It is to be understood that the group parameter generating operation shown in FIG. 4 can be performed by the group manager or by a certified authority. In addition, the same group parameters can be used irrespective of the addition/deletion of group members, since identification information of the group members is not used in the group parameter generating operation in FIG. 4. Furthermore, the length of the digital signature is fixed.

Figure 5:
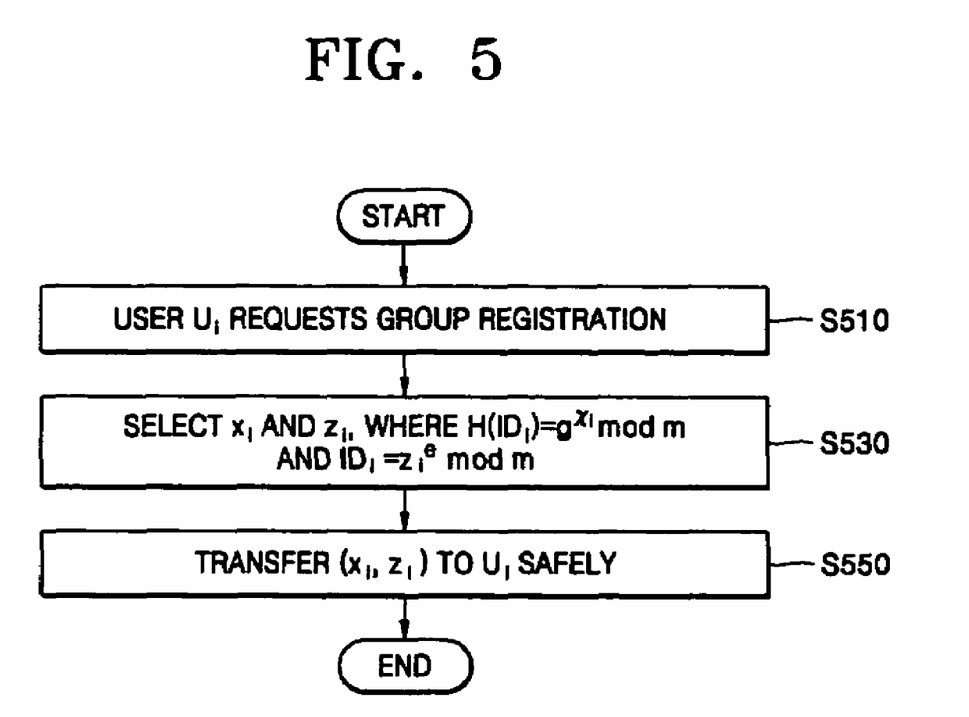
FIG. 5 is a detailed flow chart of the member registering operation in the overview flow chart of FIG. 3 according to an embodiment of the present invention.

FIG. 5 is a detailed flow chart of the member registering operation S130 in the overview flow chart of FIG. 3.

First, a request for registration is received from a new group member $U_i$ in operation S510. After the request is received, several calculations are performed using the identification information $ID_i$ of the new group member as follows.

First, with respect to identification information $ID_i$ of the new group member $U_i$, a first group member secret key information $x_i$, which satisfies $H(ID_i) \equiv g^{x_i} \bmod m$, is calculated using the second group manager public key information g. That is, the first group member secret key information $x_i$ is calculated using the identification information digest value $H(ID_i)$ obtained by applying the hash function H to the identification information $ID_i$ of the group member $U_i$. A Pohlig-Hellman algorithm can be used to calculate $x_i$. Then, a second group member secret key information $z_i$, which satisfies $ID_i \equiv z_i^e \bmod m$, is calculated using the fourth group manager public key information e in operation S530.

Then, the first and second group member secret key information $(x_i, z_i)$, which were calculated in operation S530, are safely delivered to the newly-registered group member $U_i$ in operation S550.

In the conventional digital group signature method, only identification information of group members is used as public key information of the group members. On the other hand, the digital signature method according to an embodiment of the present invention uses the identification information digest value obtained by applying the hash function to the identification information of the group members, as well as the identification information of the group members, to generate the secret key information of the group members. Therefore, the digital signature method according to the present invention protects against forgery and conspiracy attacks.

It is also possible to add the identification information $ID_i$ to the first and second group member secret key information pair $(x_i, z_i)$ which were generated in operation S530, and provide the new information pair $(x_i, z_i, ID_i)$ as authentication information of the group members. The authentication information $(x_i, z_i, ID_i)$ provided to the newly-added group member is used to perform the digital signature.

Figure 6:
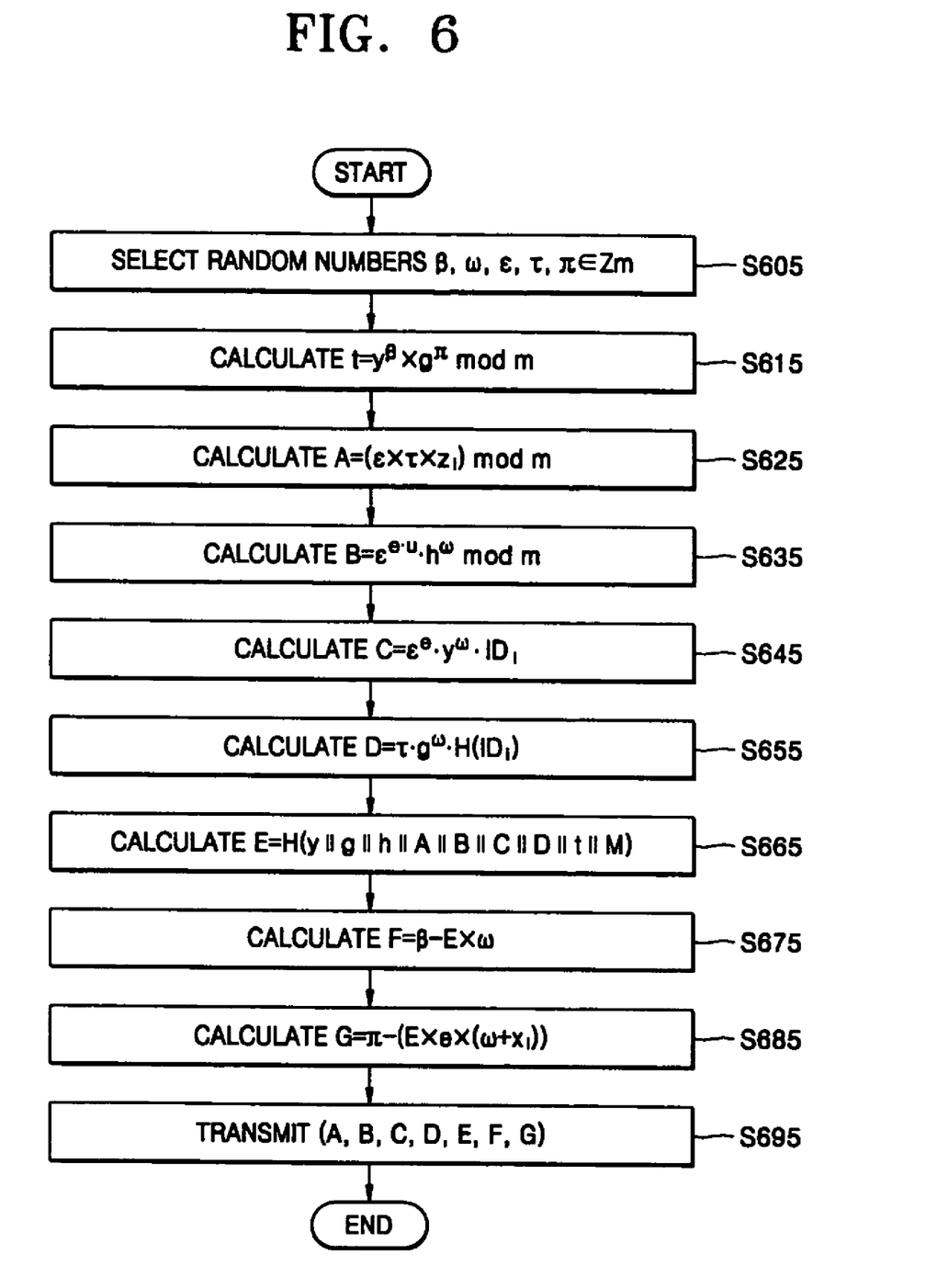
FIG. 6 is a detailed flow chart of the digital signing operation in the overview flow chart of FIG. 3 according to an embodiment of the present invention.

FIG. 6 is a detailed flow chart of the digital signing operation S150 of the overview flow chart in FIG. 3.

First, first through fifth random numbers $\beta, \omega, \epsilon, \tau, \pi$ are selected to be used in the digital signing in operation S605. All of the selected random numbers $\beta, \omega, \epsilon, \tau, \pi$ are elements of the set $Z_m$.

Then, an intermediate value t, which satisfies $t=(y^\beta \cdot g^\pi) \bmod m$, is calculated using received group manager public key information m, g, h, y, e, u in operation S615.

Then, a first digital signature information A, which satisfies $A=(\epsilon \cdot \tau \cdot z_i) \bmod m$, is generated in operation S625 using the third random number $\epsilon$ and the second group member secret key information $z_i$.

After the generation of the first digital signature information A, a second digital signature information B, which satisfies $B=\epsilon^{e \cdot u} \cdot h^\omega \bmod m$, is generated in operation S635 using the fourth group manager public key information e.

After the generation of the second digital signature information B, a third digital signature information C, which satisfies $C=\epsilon^e \cdot y^\omega \cdot ID_i$, is generated in operation S645 using the identification information $ID_i$ of the group member generating the digital signature. As shown in operation S645, the second and third random numbers $\omega, \epsilon$ are selected every time the digital signature is generated. Therefore, generated digital signature information is not identical to other generated digital signature information, even when one member generates the digital signatures, since the digital signature information is generated using different random numbers. Therefore, anonymity is secured, since it is impossible to identify the signer of a new signature even when signers of other signatures are identified. Furthermore, there is no relativity among group members, since anonymity is secured as described above.

After the generation of the third digital signature information C, a fourth digital signature information D, which satisfies $D=\tau \cdot g^\omega \cdot H(ID_i)$, is generated in operation S655 using the identification information digest value $H(ID_i)$. As shown in operation S655, the identification information digest value $H(ID_i)$ is used to generate the fourth digital signature information D.

After the generation of the fourth digital signature information D, a fifth digital signature information E, which satisfies $E=H(y\|g\|h\|A\|B\|C\|D\|t\|M)$, is generated in operation S665. Here, the operator '$\|$' is a concatenation operator. The fifth digital signature information E is transmitted for use in authentication of the digital signature.

After the generation of the fifth digital signature information E, a sixth digital signature information F, which satisfies F=β−E·ω, and a seventh digital signature information G, which satisfies G=π−E·e·(ω+x_i), are generated in operations S675 and S685, respectively. As shown in operations S675 and S685, the random numbers ω, ε used to generate the sixth and seventh digital signature information F and G are newly selected every time the digital signature is performed. Therefore, both the anonymity and the non-relativity of the signed group members are secured as described above.

With the first through seventh digital signature information A, B, C, D, E, F, G generated, the digital signature information A, B, C, D, E, F, G are sent with the message M for authentication of the digital signature in operation S695.

Figure 7:
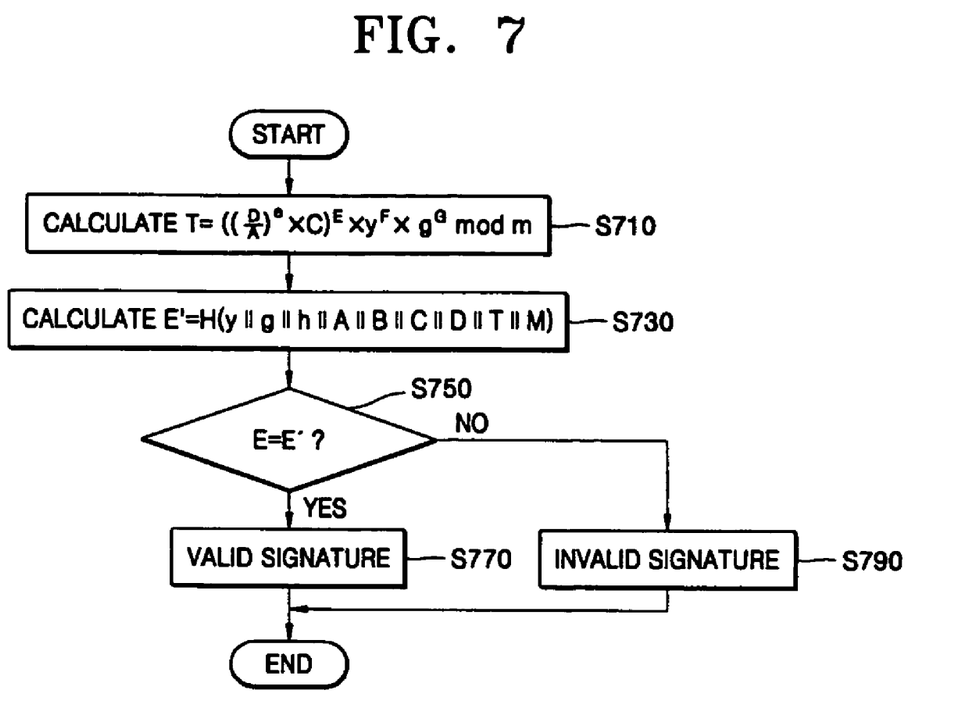
FIG. 7 is a detailed flow chart of the signature authentication operation in the overview flow chart of FIG. 3 according to an embodiment of the present invention.

FIG. 7 is a detailed flow chart of the signature authentication operation S170 of the overview flow chart in FIG. 3.

First, the first through seventh digital signature information A, B, C, D, E, F, and G of the signed-group member are received. Then, a parametric value T is calculated in operation S710 using the received first through seventh digital signature information A, B, C, D, E, F, and G, and the group manager public key information m, g, h, y, u, and e, as indicated in the following equation (1).

$$T = \left(\left(\frac{D}{A}\right)^e \cdot C\right)^E \cdot y^F \cdot g^G \bmod m \quad (1)$$

Then, an authentication value E' is calculated in operation S730 using the parametric value T calculated in operation S710 as shown in equation (2).

$$E'=H(y\|g\|h\|A\|B\|C\|D\|T\|M) \quad (2)$$

A relationship between the authentication value E' and the parametric value T is used in operation S750 to determine whether the digital signature is valid. This determination is as follows.

First, the right-hand term in equation (1) is calculated.

$$\left(\left(\frac{D}{A}\right)^e \cdot C\right)^E = \left(\frac{(\tau \cdot g^w \cdot H(ID_i))^e \cdot C}{(\varepsilon \cdot \tau)^e \cdot z_i^e}\right)^E \quad (3)$$

$$= \left(\frac{(g^w \cdot H(ID_i))^e \cdot (\varepsilon^e \cdot y^w \cdot ID_i)}{\varepsilon^e \cdot ID_i}\right)^E$$

$$= g^{e \cdot w \cdot E} \cdot H(ID_i)^{e \cdot E} \cdot y^{w \cdot E}$$

Then, equation (4) is obtained from equations (3) and (1).

$$T = \left(\left(\frac{D}{A}\right)^e \cdot C\right)^E \cdot y^F \cdot g^G \bmod m \quad (4)$$

$$= g^{e \cdot w \cdot E} \cdot H(ID_i)^{e \cdot E} \cdot y^{w \cdot E} \cdot y^F \cdot g^G \bmod m$$

$$= g^{e \cdot w \cdot E} \cdot H(ID_i)^{e \cdot E} \cdot y^{w \cdot E} \cdot y^{\beta - w \cdot E} \cdot g^{\pi - e \cdot (w + x_i) \cdot E} \bmod m$$

Further:

$$g^{x_i} = H(ID_i) \quad (5)$$

Using equations (4) and (5), direct algebraic manipulations result in equation (6).

$$g^{e \cdot w \cdot E} \cdot H(ID_i)^{e \cdot E} \cdot y^{w \cdot E} \cdot y^{\beta - w \cdot E} \cdot g^{\pi - e \cdot (w + x_i) \cdot E} \bmod m = g^{e \cdot w \cdot E} \cdot H(ID_i)^{e \cdot E} \cdot y^{\beta} \cdot g^{\pi} \cdot g^{-e \cdot w \cdot E} \cdot H(ID_i)^{-e \cdot E} \bmod m \quad (6)$$

$$= y^{\beta} \cdot g^{\pi}$$

$$= t$$

As apparent from equation (6), T=t when the digital signature is valid. As can be seen from the above definitions, the authentication value E' and the fifth digital signature information E are identical when T=t. Thus, when E=E', the digital signature is determined to be valid in operation S770. When E≠E', the digital signature is determined to be invalid in operation S790.

Figure 8:
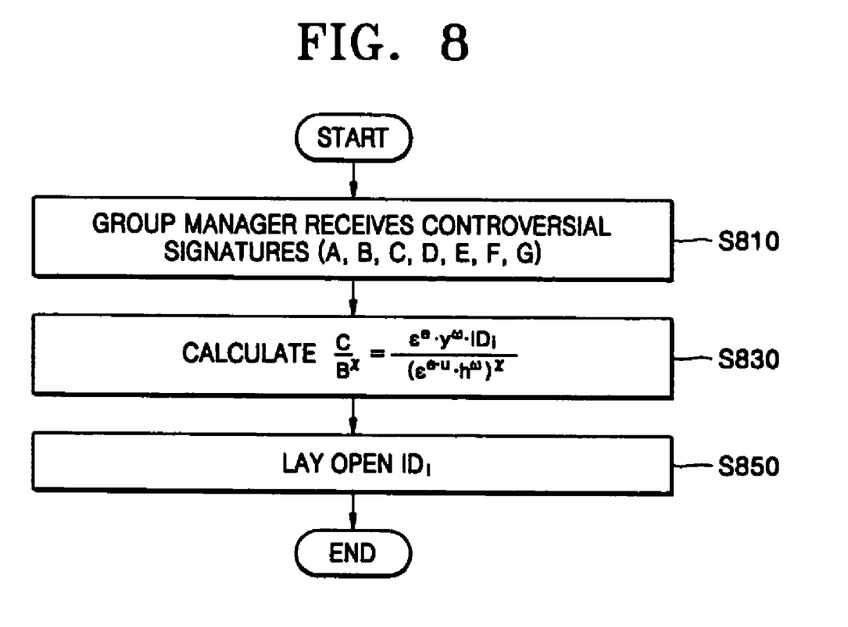
FIG. 8 is a detailed flow chart of the identification information acquiring operation in the overview flow chart of FIG. 3 according to an embodiment of the present invention.

FIG. 8 is a detailed flow chart of the identification information acquiring operation S190 of the overview flow chart in FIG. 3.

First, the group manager receives the digital signature information A, B, C, D, E, F, and G of a controversial digital signature in operation S810.

The group manager acquires the identification information $ID_i$ of the signed-member using the received digital signature information A, B, C, D, E, F, and G, and the group manager secret key information x in operation S830. The algorithm used in one embodiment of the present invention for this operation is based on equation (7).

$$\frac{C}{B^x} = \frac{\varepsilon^e \cdot y^w \cdot ID_i}{(\varepsilon^{e \cdot u} \cdot h^w)^x} \quad (7)$$

Since it is known that equation (8) holds, $$x \cdot u \equiv 1 \bmod \Phi(m) \quad (8)$$

Equation (9) can be induced by direct algebraic manipulations from equations (7) and (8).

$$\frac{\varepsilon^e \cdot y_w \cdot ID_i}{(\varepsilon^{e \cdot u} \cdot h^w)^x} = \frac{\varepsilon^e \cdot y^w \cdot ID_i}{\varepsilon^e \cdot (h^x)^w} \quad (9)$$

$$= \frac{y^w \cdot ID_i}{y^w}$$

$$= ID_i$$

Referring to equation (7), only the group manager can acquire the identification information of the signed-member, since the group manager secret key information x is used in equation (7).

Figure 9:
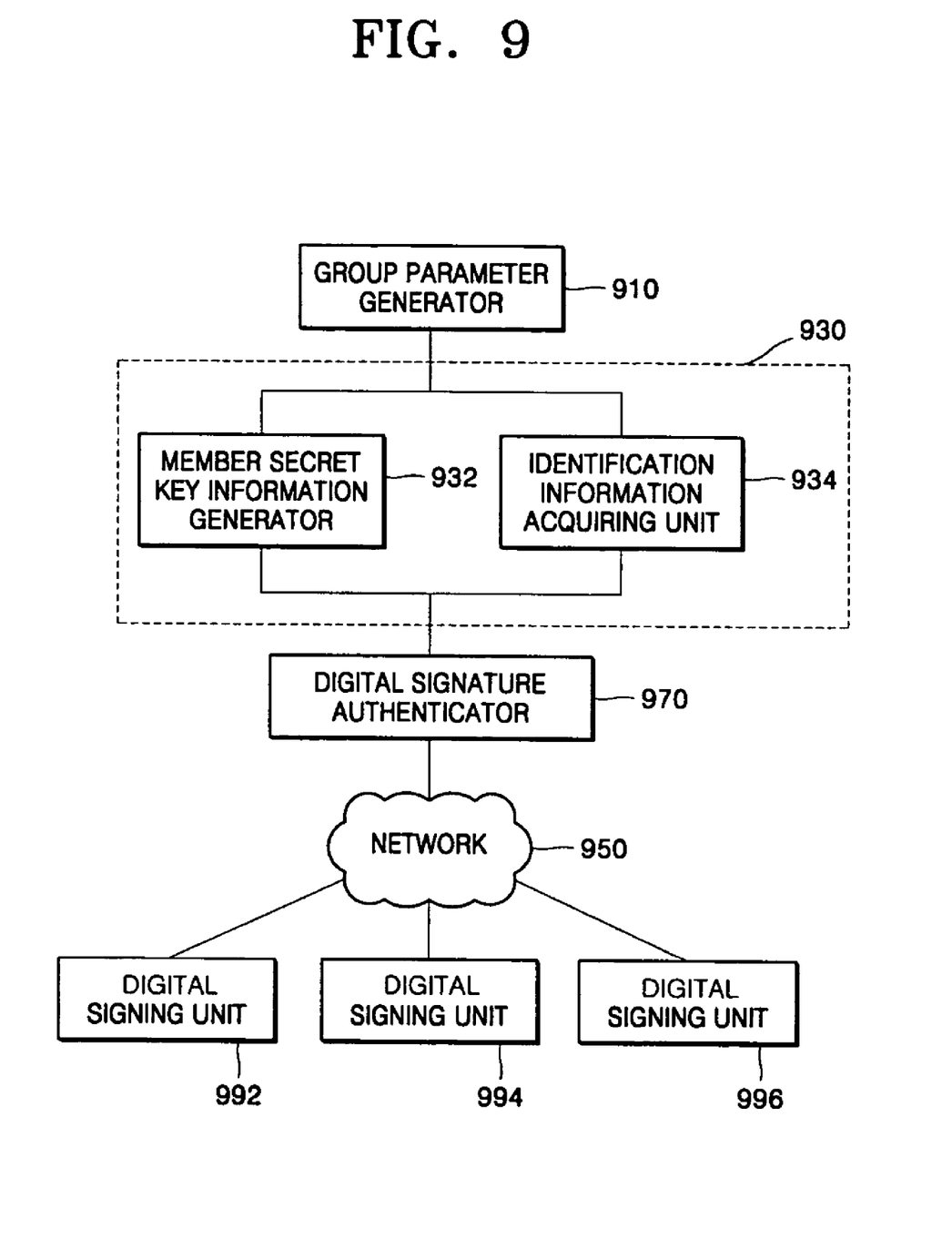
FIG. 9 is a block diagram of a digital signature system based on identification information of group members according to another embodiment of the present invention.

FIG. 9 is a block diagram of a digital signature system based on identification information of group members according to another embodiment of the present invention.

The digital signature system according to another embodiment of the present invention includes a group parameter generator 910, a group manager 930, a digital signature authenticator 970, and at least one digital signing unit 992, 994, and 996. In addition, the group manager 930 includes a member secret key information generator 932 and an identification information acquiring unit 934. The elements shown in FIG. 9 are implemented to perform the digital signature method according to an embodiment of the present invention. That is, the group parameter generator 910 may perform the group parameter generating operation shown in FIG. 4. Also, the member secret key information generator 932 may perform the group member registering operation shown in FIG. 5.

The first through third digital signing units 992, 994, and 996 may perform digital signature generation according to the algorithm shown in FIG. 6. The digital signature generated by one of the first through third digital signing units 992, 994, and 996, is authenticated by the digital signature authenticator 970. The digital signature authenticator 970 shown in FIG. 9 may authenticate the digital signature using the authentication operation shown in FIG. 7. When the signer of the digital signature is to be identified because there is a problem in one of the digital signatures, the identification information acquiring unit 934 acquires the identification information of the signed-member. The identification information acquiring unit 934 according to another embodiment of the present invention may acquire the identification information of the signed-member using the operation shown in FIG. 8. The operation of the elements are similar to those explained using FIG. 4 through FIG. 8, therefore, further descriptions are omitted.

In the digital signature system shown in FIG. 9, all of the member secret key information generator 932 and the identification information acquiring unit 934 are embedded in the group manager 930. However, this is a mere embodiment of the present invention, and it is understood that the member secret key information generator 932 and the identification information acquiring unit 934 are not necessarily embedded in the same group manager. Rather, the member secret key information generator 932 can be separated and implemented outside the system. It is advantageous to divide the functionality of the group manager, since the identification information still has to be acquired even during if the group manager malfunctions.

According to the group signature method and system based on identification information according the present invention, the member secret key information generating function and the identification information acquiring function are separated, since different key information is used when registering group members and acquiring identification information.

Tables 1 and 2 show a comparison of the group digital signature method based on identification information according to the present invention and that of the conventional art. The conventional art used below is disclosed by Shundong Xia et al., "A group signature scheme with strong separability," *The Journal of Systems and Software*, Vol. 60, pages 177-182 (2002).

TABLE 1

| Method | Performance | | | Safety | | |
|---|---|---|---|---|---|---|
| | Signature length | Member addition deletion | Separability of group manager functions | forgery | conspiracy | Relativity |
| Conventional art | Fixed | Not affected | Possible | Possible | Possible | Possible |
| Present invention | Fixed | Not affected | Possible | Impossible | Impossible | Impossible |

TABLE 2

| Method | | variables | number of calculations | | | |
|---|---|---|---|---|---|---|
| | | | +, − | * | / | power |
| Conventional art | Key generation | | 0 | 0 | 0 | 2 |
| | Signing | 11 | 3 | 6 | 2 | 8 |
| | Authentication | 5 | 0 | 4 | 1 | 8 |
| | Laying open | | 0 | 0 | 1 | 1 |
| Present invention | Key generation | | 0 | 0 | 0 | 2 |
| | Signing | 8 | 3 | 11 | 0 | 5 |
| | Authentication | 2 | 0 | 3 | 1 | 4 |
| | Laying open | | 0 | 0 | 1 | 1 |

As shown in tables 1 and 2, the present invention outperforms the conventional art in improved safety, reduced number of variables and simplified computation.

The present invention can be implemented as a computer-readable code recorded on a computer-readable recording medium. The computer-readable medium includes all kinds of recording medium on which the data which is read by the computer is written, such as, ROM, RAM, CD-ROM, magnetic tapes, floppy disks, optical data storage medium, etc.

According to an embodiment of the present invention, a digital signature method based on the identification information of group members which performs digital signature irrespective of addition/deletion of group members is provided.

In addition, a method for acquiring identification information of the group member who performed the signature is provided according to an embodiment of the present invention.

Furthermore, a digital signature system based on the identification information of the group members which is safe from attacks from the outside is provided according to an embodiment the present invention.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A digital signature method based on identification information of one or more group members who belong to a group, the method comprising:

a) a group parameter generating operation including generating group public key information and group secret key information corresponding to the group;

b) a member registering operation including generating member secret key information using identification information of the group members who belong to the group and an identification information digest value obtained by applying a predetermined hash function on the identification information, and transmitting the member secret key information to the group members;

c) a digital signing operation including generating a digital signature by applying a predetermined signature procedure to the identification information and the identification information digest value, and transmitting the generated digital signature and a message; and d) an authentication operation including verifying a validity of the digital signature by applying a predetermined authentication procedure to the message and the digital signature, wherein the predetermined signature procedure uses different random numbers every time a digital signature is generated, and the group parameter generating operation includes:

a1) selecting prime numbers p and q as first and second group manager secret key information, and calculating a first group manager public key information $m=p\times q$ (where, a first set $Z_m=\{0, 1, \ldots, m-1\}$ and a second set $Z_m^*=\{a \in Z_m/\gcd(m, a)=1\}$, where a is an element of the first set that is also coprime with the first group manager public key information m, i.e., a greatest common divisor (gcd) of m and a is one);

a2) selecting g, which satisfies $g<\min(p, q)$, as a second group manager public key information;

a3) selecting a third group manager secret key information x, which satisfies $x \in \{a \in Z_m/\gcd(a, \Phi(m))=1\}$, where a is an element of the first set that is also coprime with $\Phi(m)$, i.e., a greatest common divisor (gcd) of $\Phi(m)$ and a is one, and $\Phi(m)=(p-1)(q-1)$, selecting an arbitrary number $h \in Z_m^*$, where the arbitrary number h is an element of the second set, and calculating an arbitrary public key information $y \equiv h^x$ mod m, i.e., the arbitrary public key information y is defined as a remainder of h raised to the power of the third group manager secret key information x, which is then divided by the first group manager public key information m;

a4) calculating a third group manager public key information u, which satisfies $x \cdot u \equiv 1 \mod \Phi(m)$, i.e., the third group manager public key information u is defined as a remainder of 1 divided by $\Phi(m)$, which is then divided by the third group manager secret key information x;

a5) selecting a fourth group manager public key information e, and calculating a fourth group manager secret key information d, which satisfies $e \cdot d \equiv 1 \mod \Phi(m)$, (where, $\gcd(e, \Phi(m))=1$, i.e., the fourth group manager public key information e and $\Phi(m)$ are coprime and the fourth group manager public key information e is defined as a remainder of 1 divided by $\Phi(m)$, which is then divided by the fourth group manager secret key information d; and a6) laying open the first through fourth group manager public key information m, g, u, e, the arbitrary number h, and the arbitrary public key information y as a group manager public key information and storing the first through the fourth group manager secret key information p, q, x, d as a group manager secret key information.

2. The method as claimed in claim 1, wherein the member registering operation comprises:

b1) with respect to identification information $ID_i$ of group members $U_i$, calculating a first group member secret key information $x_i$, which satisfies $H(ID_i) \equiv g^{x_i} \mod m$, using the second group manager public key information g (where, H is a unidirectional hash function and $H(ID_i)$ is an identification information digest value equal to a remainder of the second group manager public key information g raised to a power of the first group member secret key information $x_i$, which is then divided by the first group manager public key information m);

b2) calculating a second group member secret key information $z_i$, which satisfies $ID_i \equiv z_i^e \mod m$, using the fourth group manager public key information e, where $ID_i$ is equal to a remainder of the second group member secret key information $z_i$ raised to a power of the fourth group manager public key information e, which is then divided by the first group manager public key information m; and b3) transmitting the first and second group member secret key information $(x_i, z_i)$ to the group members.

3. The method as claimed in claim 2, wherein the digital signing operation comprises:

c1) selecting first through fifth random numbers $\beta, \omega, \epsilon, T, \pi$ (where, $\beta, \omega, \epsilon, T, \pi \in Z_m$, i.e., are all members of the first set);

c2) generating a first digital signature information A, which satisfies $A=(\epsilon \cdot T \cdot z_i) \mod m$, using the second group member secret key information $z_i$, where the first digital signature information A equals a remainder of a product of the third and fourth random numbers $\epsilon, T$ and the second group member secret key information $z_i$, divided by the first group manager public key information m;

c3) generating a second digital signature information B, which satisfies $B=\epsilon^{e \cdot u} \cdot h^\omega \mod m$, using the fourth group manager public key information e, where the second digital signature information B equals a remainder of a product of the third random number $\epsilon$ raised to a power of a product of the fourth group manager public key information e and the third group manager public key information u, and the arbitrary number h raised to a power of the second random number $\omega$, divided by the first group manager public key information m;

c4) generating a third digital signature information C, which satisfies $C=\epsilon^e \cdot y^\omega \cdot ID_i$, using the identification information $ID_i$, where the third digital signature information C equals a product of the third random number raised to a power of the fourth group manager public key information e, the arbitrary public key information raised to a power of the second random number $\omega$, and the identification information $ID_i$;

c5) generating fourth digital signature information D, which satisfies $D=T \cdot g^\omega \cdot H(ID_i)$, using the identification information digest value $H(ID_i)$, where the fourth digital signature information D equals a product of the fourth random number T, the second group manager public key information g raised to a power of the second random number $\omega$, and the identification information digest value $H(ID_i)$;

c6) generating a fifth digital signature information E, which satisfies $E=H(y\|g\|h\|A\|B\|C\|D\|t\|M)$, (where, $\|$ is a concatenation operator, an intermediate value $t=(y^\beta \cdot g^\pi)$ mod m, i.e., the intermediate value t equals a remainder of a product of the arbitrary public key information y raised to a power of the first random number $\beta$ and the second group manager public key information g raised to a power of the fifth random number $\pi$, divided by the first group manager public key information m, and M is a message);

c7) generating a sixth digital signature information F, which satisfies F=β−E·ω, where the sixth digital signature information F equals the first random number β minus a product of the fifth digital signature information E and the second random number ω;

c8) generating a seventh digital signature information G, which satisfies G=π−E·e·(ω+$x_i$), where the seventh digital signature information G equals the fifth random number π minus a product of the fifth digital signature information E, the fourth group manager public key information e, and a sum of the second random number ω and the first group member secret key information $x_i$; and c9) transmitting the first through seventh digital signature information A, B, C, D, E, F, G and the message M.

4. The method as claimed in claim 3, wherein the authentication operation comprises:

d1) calculating a parametric value $$T = \left(\left(\frac{D}{A}\right)^e \cdot C\right)^E \cdot y^F \cdot g^G \bmod m,$$

using the received first through seventh digital signature information A, B, C, D, E, F, G and the group manager public key information m, g, u, e, where the parametric value T equals a remainder of a product of a product of the fourth digital signature information D divided by the first digital signature information A and raised to a power of the fourth group manager public key information e and the third digital signature information C, that product being raised to a power of the fifth digital signature information E, the arbitrary public key information y raised to a power of the sixth digital signature information F, and the second group manager public key information g raised to a power of the seventh digital signature information G, which is then divided by the first group manager public key information m;

d2) calculating an authentication value E'=H(y∥g∥h∥A∥B∥C∥D∥T∥M), using the parametric value T, where ∥ is a concatenation operator and H is a unidirectional hash function;

d3) comparing the authentication value E' and the received fifth digital signature information E; and d4) determining that the digital signature is valid when the authentication value E' and the fifth digital signature information E are identical, and determining that the digital signature is not valid when the authentication value E' and the fifth digital signature information E are not identical.

5. A computer-readable medium having recorded thereon a computer program for performing the method according to claim 1.

6. A method for acquiring identification information of signed-group member in data encryption using public key encryption based on identification information of one or more group members who belong to a group, the method comprising:

a) a group parameter generating operation including generating group public key information and group secret key information corresponding to the group;

b) a member registering operation including generating member secret key information using identification information of the group members who belong to the group and an identification information digest value which results from application of predetermined hash function to the identification information, and transmitting the member secret key information to group members;

c) a digital signing operation including generating a digital signature by applying a predetermined signature procedure to the identification information and the identification information digest value, and transmitting the generated digital signature and a message; and d) an identification information acquiring operation including acquiring the identification information of group members who have performed the digital signature using the group secret key information, wherein the predetermined signature procedure uses different random numbers every time a digital signature is generated, and the group parameter generating operation includes:

a1) selecting prime numbers p and q as first and second group manager secret key information, and calculating a first group manager public key information m=p×q (where, a first set $Z_m$={0, 1, ..., m−1} and a second set $Z_m^*$={a∈$Z_m$/gcd(m, a)=1}, where a is an element of the first set that is also coprime with the first group manager public key information m, i.e., a greatest common divisor (gcd) of m and a is one);

a2) selecting g, which satisfies g<min (p, q), as a second group manager public key information;

a3) selecting a third group manager secret key information x, which satisfies x∈{a∈$Z_m$/gcd(a, Φ(m))=1}, where a is an element of the first set that is also coprime with Φ(m), i.e., a greatest common divisor (gcd) of Φ(m) and a is one, and Φ(m)=(p−1)(q−1), selecting an arbitrary number h∈$Z_m^*$, where the arbitrary number h is an element of the second set, and calculating an arbitrary public key information y≡$h^x$ mod m, i.e., the arbitrary public key information y is defined as a remainder of h raised to the power of the third group manager secret key information x, which is then divided by the first group manager public key information m;

a4) calculating a third group manager public key information u, which satisfies x·u≡1 mod Φ(m), i.e., the third group manager public key information u is defined as a remainder of 1 divided by Φ(m), which is then divided by the third group manager secret key information x;

a5) selecting a fourth group manager public key information e, and calculating a fourth group manager secret key information d, which satisfies e·d≡1 mod Φ(m) (where, gcd(e, Φ(m))=1), i.e., the fourth group manager public key information e and Φ(m) are coprime and the fourth group manager public key information e is defined as a remainder of 1 divided by Φ(m), which is then divided by the fourth group manager secret key information d; and a6) laying open the first through fourth group manager public key information m, g, u, e, the arbitrary number h, and the arbitrary public key information y as a group manager public key information and storing the first through the fourth group manager secret key information p, q, x, d as a group manager secret key information.

7. The method as claimed in claim 6, wherein the member registering operation comprises:

b1) with respect to identification information $ID_i$ of group members $U_i$, calculating a first group member secret key information $x_i$, which satisfies H($ID_i$)≡$g^{x_i}$ mod m, using the second group manager public key information g (where, H is a unidirectional hash function and $H(ID_i)$ is an identification information digest value equal to a remainder of the second group manager public key information g raised to a power of the first group member secret key information $x_i$, which is then divided by the first group manager public key information m);

b2) calculating a second group member secret key information $z_i$, which satisfies $ID_i \equiv z_i^e$ mod m, using the fourth group manager public key information e, where $ID_i$ is equal to a remainder of the second group member secret key information $z_i$ raised to a power of the fourth group manager public key information e, which is then divided by the first group manager public key information m; and b3) transmitting the first and second group member secret key information $x_i$, $z_i$ to the group members.

8. The method as claimed in claim 7, wherein the digital signing operation comprises:

c1) selecting first through fifth random numbers $\beta$, $\omega$, $\epsilon$, T, $\pi$ (where, $\beta$, $\omega$, $\epsilon$, T, $\pi \in Z_m$ i.e., are all members of the first set);

c2) generating a first digital signature information A, which satisfies $A = (\epsilon \cdot T \cdot z_i)$ mod m, using the second group member secret key information $z_i$, where the first digital signature information A equals a remainder of a product of the third and fourth random numbers $\epsilon$, T and the second group member secret key information $z_i$, divided by the first group manager public key information m;

c3) generating a second digital signature information B, which satisfies $B = \epsilon^{e \cdot u} \cdot h^\omega$ mod m, using the fourth group manager public key information e, where the second digital signature information B equals a remainder of a product of the third random number $\epsilon$ raised to a power of a product of the fourth group manager public key information e and the third group manager public key information u, and the arbitrary number h raised to a power of the second random number $\omega$, divided by the first group manager public key information m;

c4) generating a third digital signature information C, which satisfies $C = \epsilon^e \cdot y^\omega \cdot ID_i$, using the identification information $ID_i$, where the third digital signature information C equals a product of the third random number raised to a power of the fourth group manager public key information e, the arbitrary public key information y raised to a power of the second random number $\omega$, and the identification information $ID_i$;

c5) generating a fourth digital signature information D, which satisfies $D = T \cdot g^\omega \cdot H(ID_i)$, using the identification information digest value $H(ID_i)$, where the fourth digital signature information D equals a product of the fourth random number T, the second group manager public key information g raised to a power of the second random number $\omega$, and the identification information digest value $H(ID_i)$;

c6) generating a fifth digital signature information E, which satisfies $E = H(y\|g\|h\|A\|B\|C\|D\|T\|M)$, (where, $\|$ is a concatenation operator, $t = (y^\beta \cdot g^\pi)$ mod m, i.e., the intermediate value t equals a remainder of a product of the arbitrary public key information y raised to a power of the first random number $\beta$ and the second group manager public key information g raised to a power of the fifth random number $\pi$, divided by the first group manager public key information m, and M is a message);

c7) generating a sixth digital signature information F, which satisfies $F = \beta - E \cdot \omega$, where the sixth digital signature information F equals the first random number $\beta$ minus a product of the fifth digital signature information E and the second random number $\omega$;

c8) generating a seventh digital signature information G, which satisfies $G = \pi - E \cdot e \cdot (\omega + x_i)$, where the seventh digital signature information G equals the fifth random number $\pi$ minus a product of the fifth digital signature information E, the fourth group manager public key information e, and a sum of the second random number $\omega$ and the first group member secret key information $x_i$); and c9) transmitting the first through seventh digital signature information A, B, C, D, E, F, G and the message M.

9. The method as claimed in claim 8, wherein the identification information acquiring operation comprises:

d1) calculating $C/B^x$, using the third group manager secret key information x, i.e., the third digital signature information C divided by the second digital signature information B raised to a power of the third group manager secret key information x; and d2) providing the result from d1) as identification information of members.

10. A computer-readable medium having recorded thereon a computer program for performing the method according to claim 6.

11. A digital signature system performing digital signature based on identification information of one or more group members who belong to a group, the system comprising:

a group parameter generator configured to generate group public key information and group secret key information corresponding to the group;

a member secret key information generator configured to generate member secret key information using identification information of the group members who belong to the group and an identification information digest value obtained by applying a predetermined hash function to the identification information, and to transmit the member secret key information to the group members;

a digital signing unit configured to generate a digital signature by applying a predetermined signature procedure to the identification information and the identification information digest value, and to transmit the generated digital signature and a message; and a digital signature authenticator configured to verify a validity of the digital signature by applying a predetermined authentication procedure to the message and the digital signature, wherein the digital signing unit is configured to use different random numbers every time a digital signature is generated, and the group parameter generator includes:

a first calculator configured to select prime numbers p and q as first and second group manager secret key information, and to calculate a first group manager public key information $m = p \times q$ (where, a first set $Z_m = \{0, 1, \ldots, m-1\}$ and a second set $Z_m^* = \{a \in Z_m / \gcd(m, a) = 1\}$, where a is an element of the first set that is also coprime with the first group manager public key information m, i.e., a greatest common divisor (gcd) of m and a is one);

a second calculator configured to select g, which satisfies $g < \min(p, q)$, as a second group manager public key information;

a third calculator configured to select a third group manager secret key information x, which satisfies $x \in \{a \in Z_m / \gcd(a, \Phi(m)) = 1\}$, where a is an element of the first set that is also coprime with $\Phi(m)$, i.e., a greatest common divisor (gcd) of $\Phi(m)$ and a is one, and $\Phi(m)=(p-1)(q-1)$, to select an arbitrary number $h \in Z_m^*$, where the arbitrary number h is an element of the second set, and to calculate an arbitrary public key information $y \equiv h^x \mod m$, i.e., the arbitrary public key information y is defined as a remainder of h raised to the power of the third group manager secret key information x, which is then divided by the first group manager public key information m;

a fourth calculator configured to calculate a third group manager public key information u, which satisfies $x \cdot u \equiv 1 \mod \Phi(m)$), i.e., the third group manager public key information u is defined as a remainder of 1 divided by $\Phi(m)$, which is then divided by the third group manager secret key information x;

a fifth calculator configured to select a fourth group manager public key information e and to calculate a fourth group manager secret key information d, which satisfy $e \cdot d \equiv 1 \mod \Phi(m)$ (where, $\gcd(e, \Phi(m))=1$), i.e., the fourth group manager public key information e and $\Phi(m)$ are coprime and the fourth group manager public key information e is defined as a remainder of 1 divided by $\Phi(m)$, which is then divided by the fourth group manager secret key information d; and a group manager configured to lay open the first through fourth group manager public key information m, g, u, e, the arbitrary number h, and the arbitrary public key information y as a group manager public key information and to store the first through the fourth group manager secret key information p, q, x, d as a group manager secret key information.

12. The digital signature system as claimed in claim 11, the digital signature system further comprising an identification information acquiring unit configured to acquire the identification information of group members performing digital signatures using the group secret key information.

13. The digital signature system as claimed in claim 11, wherein the member secret key information generator comprises:

a first generator configured to calculate a first group member secret key information $x_i$, which satisfies $H(ID_i) \equiv g^{xi} \mod m$ with respect to the identification information $ID_i$ of group members $U_i$, using the second group manager public key information g, (where, H is a unidirectional hash function and $H(ID_i)$ is an identification information digest value equal to a remainder of the second group manager public key information g raised to a power of the first group member secret key information $x_i$, which is then divided by the first group manager public key information m);

a second generator configured to calculate a second group member secret key information $z_i$, which satisfies $ID_i \equiv z_i^e \mod m$, using the fourth group manager public key information e, where $ID_i$ is equal to a remainder of the second group member secret key information $z_i$ raised to a power of the fourth group manager public key information e, which is then divided by the first group manager public key information m; and a group member secret key transmitter configured to transmit the first and second group member secret key information $x_i$, $z_i$ to the group members.

14. The digital signature system as claimed in claim 13, wherein the digital signature system comprises:

a random number selector configured to select first through fifth random numbers $\beta$, $\omega$, $\epsilon$, T, $\pi$ (where, $\beta$, $\omega$, $\epsilon$, T, $\pi \in Z_m$, i.e., are all members of the first set);

a first signature information generator configured to generate a first digital signature information A, which satisfies $A=(\epsilon \cdot T \cdot z_i) \mod m$, using the second group members secret key information $z_i$, where the first digital signature information A equals a remainder of a product of the third and fourth random numbers $\epsilon$, T and the second group member secret key information $z_i$, divided by the first group manager public key information m;

a second signature information generator configured to generate a second digital signature information B, which satisfies $B=\epsilon^{e \cdot u} \cdot h^\omega \mod m$, using the fourth group manager public key information e, where the second digital signature information B equals a remainder of a product of the third random number $\epsilon$ raised to a power of a product of the fourth group manager public key information e and the third group manager public key information u, and the arbitrary number h raised to a power of the second random number $\omega$, divided by the first group manager public key information m;

a third signature information generator configured to generate a third digital signature information C, which satisfies $C=\epsilon^e \cdot y^\omega \cdot ID_i$, using the identification information $ID_i$, where the third digital signature information C equals a product of the third random number raised to a power of the fourth group manager public key information e, the arbitrary public key information y raised to a power of the second random number $\omega$, and the identification information $ID_i$;

a fourth signature information generator configured to generate a fourth digital signature information D which satisfies $D=\tau \cdot g^\omega \cdot H(ID_i)$, using the identification information digest value $H(ID_i)$, where the fourth digital signature information D equals a product of the fourth random number T, the second group manager public key information g raised to a power of the second random number $\omega$, and the identification information digest value $H(ID_i)$;

a fifth signature information generator configured to generate a fifth digital signature information E, which satisfies $E=H(y\|g\|h\|A\|B\|C\|D\|T\|M)$, (where, $\|$ is a concatenation operator, $t=(y^\beta \cdot g^\pi) \mod m$, i.e., the intermediate value t equals a remainder of a product of the arbitrary public key information y raised to a power of the first random number $\beta$ and the second group manager public key information g raised to a power of the fifth random number $\pi$, divided by the first group manager public key information m, and M is a message);

a sixth signature information generator configured to generate a sixth digital signature information F, which satisfies $F=\beta-E \cdot \omega$, where the sixth digital signature information F equals the first random number $\beta$ minus a product of the fifth digital signature information E and the second random number $\omega$;

a seventh signature information generator configured to generate a seventh digital signature information G, which satisfies $G=\pi-E \cdot e \cdot (\omega+x_i)$, where the seventh digital signature information G equals the fifth random number $\pi$ minus a product of the fifth digital signature information E, the fourth group manager public key information e, and a sum of the second random number $\omega$ and the first group member secret key information $x_i$); and a signature information transmitter configured to transmit the first through seventh digital signature information A, B, C, D, E, F, G and the message M.

15. The digital signature system as claimed in claim 14, wherein the digital signature authenticator comprises:

a parametric value calculator configured to calculate parametric value $$T = \left(\left(\frac{D}{A}\right)^e \cdot C\right)^E \cdot y^F \cdot g^G \bmod m,$$

using the received first through seventh digital signature information A, B, C, D, E, F, G and the group manager public key information m, g, u, e, where the parametric value T equals a remainder of a product of a product of the fourth digital signature information D divided by the first digital signature information A and raised to a power of the fourth group manager public key information e and the third digital signature information C, that product being raised to a power of the fifth digital signature information E, the arbitrary public key information y raised to a power of the sixth digital signature information F, and the second group manager public key information g raised to a power of the seventh digital signature information G, which is then divided by the first group manager public key information m;

an authentication value calculator configured to calculate an authentication value E'=H(y||g||h||A||B||C||D||T||M), using the parametric value T, where || is a concatenation operator and H is a unidirectional hash function;

a comparator configured to compare the authentication value E' and the received fifth digital signature information E; and a determining unit configured to determine that the digital signature is valid when the authentication value E' and the fifth digital signature information E are identical, and to determine that the digital signature is not valid when the authentication value E' and the fifth digital signature information E are not identical.

16. The digital signature system as claimed in claim 15, wherein the identification acquiring unit comprises:

an identification information calculator configured to calculate $C/B^x$ using the third group manager secret key information x, i.e., the third digital signature information C divided by the second digital signature information B raised to a power of the third group manager secret key information x; and an identification information provider configured to provide an output of the identification information calculator as identification information of members.

* * * * *